US009693392B2

(12) United States Patent
Iolli

(10) Patent No.: US 9,693,392 B2
(45) Date of Patent: Jun. 27, 2017

(54) INFRARED HEATER APPLIANCE, PARTICULARLY SUITABLE FOR USE IN AREAS AT RISK OF EXPLOSION

(71) Applicant: STAR PROGETTI TECNOLOGIE APPLICATE S.P.A., Tribiano (Milan) (IT)

(72) Inventor: Vittorio Iolli, San Giuliano Milanese (IT)

(73) Assignee: STAR PROGETTI TECNOLOGIE APPLICATE S.P.A., Tribiano (Milan) (IT)

( * ) Notice: Subject to any disclaimer, the term of this patent is extended or adjusted under 35 U.S.C. 154(b) by 424 days.

(21) Appl. No.: 14/314,123

(22) Filed: Jun. 25, 2014

(65) Prior Publication Data

US 2015/0382404 A1 Dec. 31, 2015

(51) Int. Cl.

| | |
|---|---|
| ***A21B 2/00*** | (2006.01) |
| ***H05B 3/00*** | (2006.01) |
| ***H05B 3/04*** | (2006.01) |

(52) U.S. Cl.
CPC ............. *H05B 3/0033* (2013.01); *H05B 3/04* (2013.01); *H05B 2203/032* (2013.01)

(58) Field of Classification Search
CPC . H05B 3/033; H05B 3/02; H05B 3/04; H05B 3/746; H05B 2203/032; F16K 24/04; F16K 24/02; F21V 31/03; F21S 48/335
See application file for complete search history.

(56) References Cited

U.S. PATENT DOCUMENTS 6,254,258 B1 * 7/2001 Case ....................... F16K 24/04 362/294

FOREIGN PATENT DOCUMENTS

| | | |
|---|---|---|
| DE | 18 62 449 | 11/1962 |
| DE | 31 17 592 | 1/1983 |
| EP | 0 979 971 | 2/2000 |
| WO | 00/71932 | 11/2000 |

OTHER PUBLICATIONS

European Search Report dated Jun. 2, 2014, corresponding to European Patent Application No. 13 18 7338.

* cited by examiner

*Primary Examiner* — Shawntina Fuqua
(74) *Attorney, Agent, or Firm* — Young & Thompson

(57) ABSTRACT

An infrared heater appliance with airtight chamber, includes a bulb housed in a shell (2) constituted by a cap (3) and a closure lid (4), wherein a safety valve (10) is provided, mounted on the cap (3), suitable for discharging externally the overpressure that may be caused in the airtight chamber due to the heat generated by the infrared bulb.

11 Claims, 3 Drawing Sheets

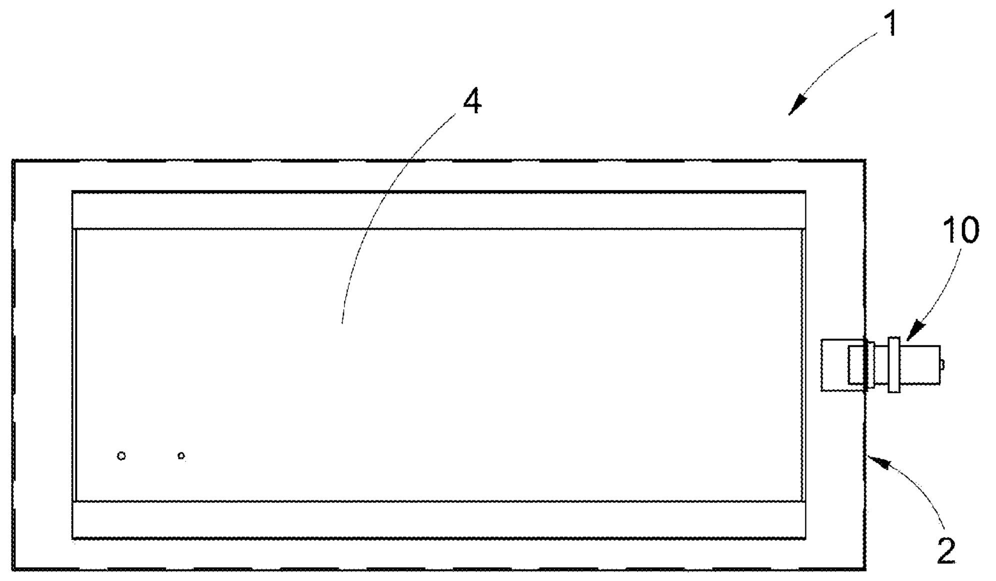
FIG. 1
FIG. 2
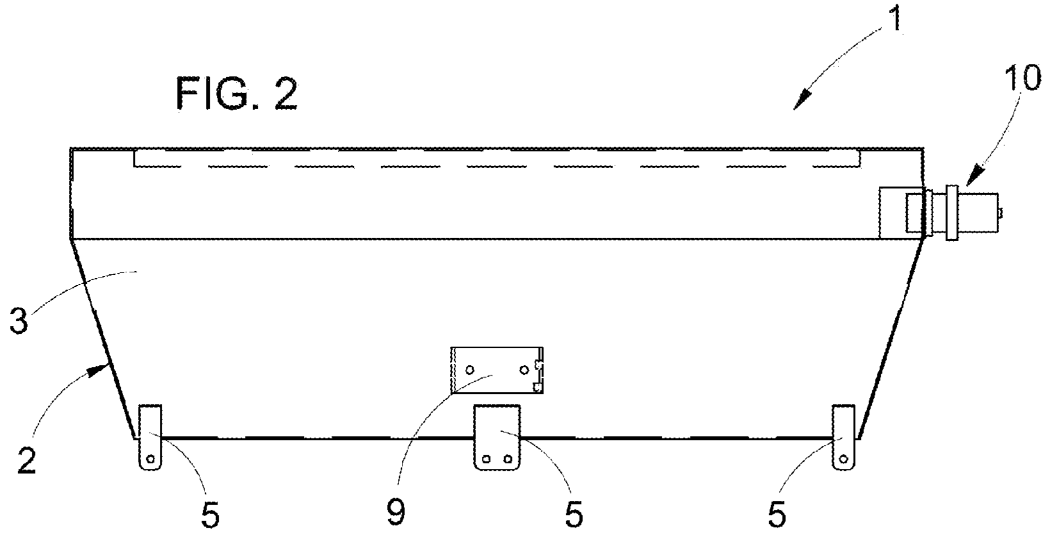
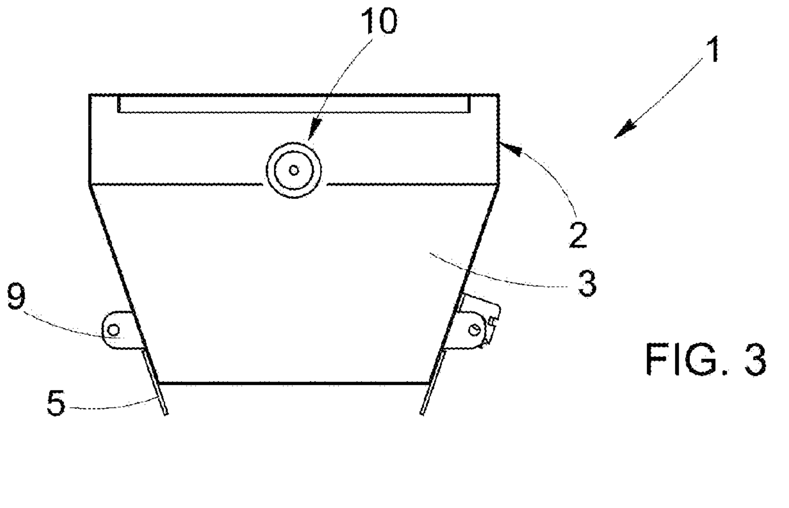
FIG. 3

INFRARED HEATER APPLIANCE, PARTICULARLY SUITABLE FOR USE IN AREAS AT RISK OF EXPLOSION

BACKGROUND OF THE INVENTION

The present invention relates to an infrared heater, compliant with the ATEX standard, i.e. directive 94/9/EC of the European Union for the regulation of equipment intended for use in areas at risk of explosion.

Infrared heaters comprise at least one bulb capable of transmitting radiation in the field of the infrared wavelength (therefore typically comprised between 700 nm and 1 mm), with a power that currently reaches a maximum of 4 kW. The bulb is placed frontally to a reflector that is enclosed in a cap of material suitable for resisting both thermal stresses and those caused by the environment in which the appliance is placed, therefore able to withstand high temperatures and with a low coefficient of heat transmission. The cap is tightly closed frontally by a lid, normally in glass-ceramic, also resistant to high temperatures. In practice the entire appliance is airtight, so that the infrared bulb is located in an airtight chamber, to prevent any external explosive mixtures from coming into contact with the internal electrical components.

The Applicant has found that with infrared bulbs with high power, for example 2 kW or 4 kW, an increase in the internal pressure is caused due to the increase in temperature, which in some cases causes the explosion of the glass lid, with obvious disadvantages.

SUMMARY OF THE INVENTION

The object of the invention is precisely that of eliminating the aforesaid disadvantages by providing an infrared heater provided with a safety device which eliminates any risk of explosion.

Another object of the invention is that of providing such an infrared heater with safety device of simple and economical design.

These objects are achieved by the infrared heater according to the invention, which has the features of the annexed independent claim 1.

Advantageous embodiments of the invention are disclosed by the dependent claims.

Substantially, the infrared ray heater according to the invention, of the type with airtight chamber, has on the cap a safety valve calibrated so as to ensure a maximum pressure inside the apparatus and discharge externally the possible overpressure which may be created in the chamber containing the radiating bulb.

The safety valve comprises a body attached to the cap of the appliance, having internally a shutter normally held closed by an appropriately calibrated spring, whose force is overcome when the internal pressure of the appliance exceeds a certain value.

The use of the safety valve enables the proper functioning of the infrared heaters of the maximum power which can be reached, currently 4 kW, observing the abovementioned ATEX standard.

BRIEF DESCRIPTION OF THE DRAWINGS

Further features of the invention will be made clearer by the following detailed description, referred to a purely non-limiting example thereof and illustrated in the accompanying drawings, in which:

FIG. 1 is a schematic front view of an infrared heater appliance according to the invention;

FIG. 2 is a side elevation view, taken from below with respect to FIG. 1;

FIG. 3 is a view of the right side of FIG. 2;

DESCRIPTION OF PREFERRED EMBODIMENTS

Figure 4:
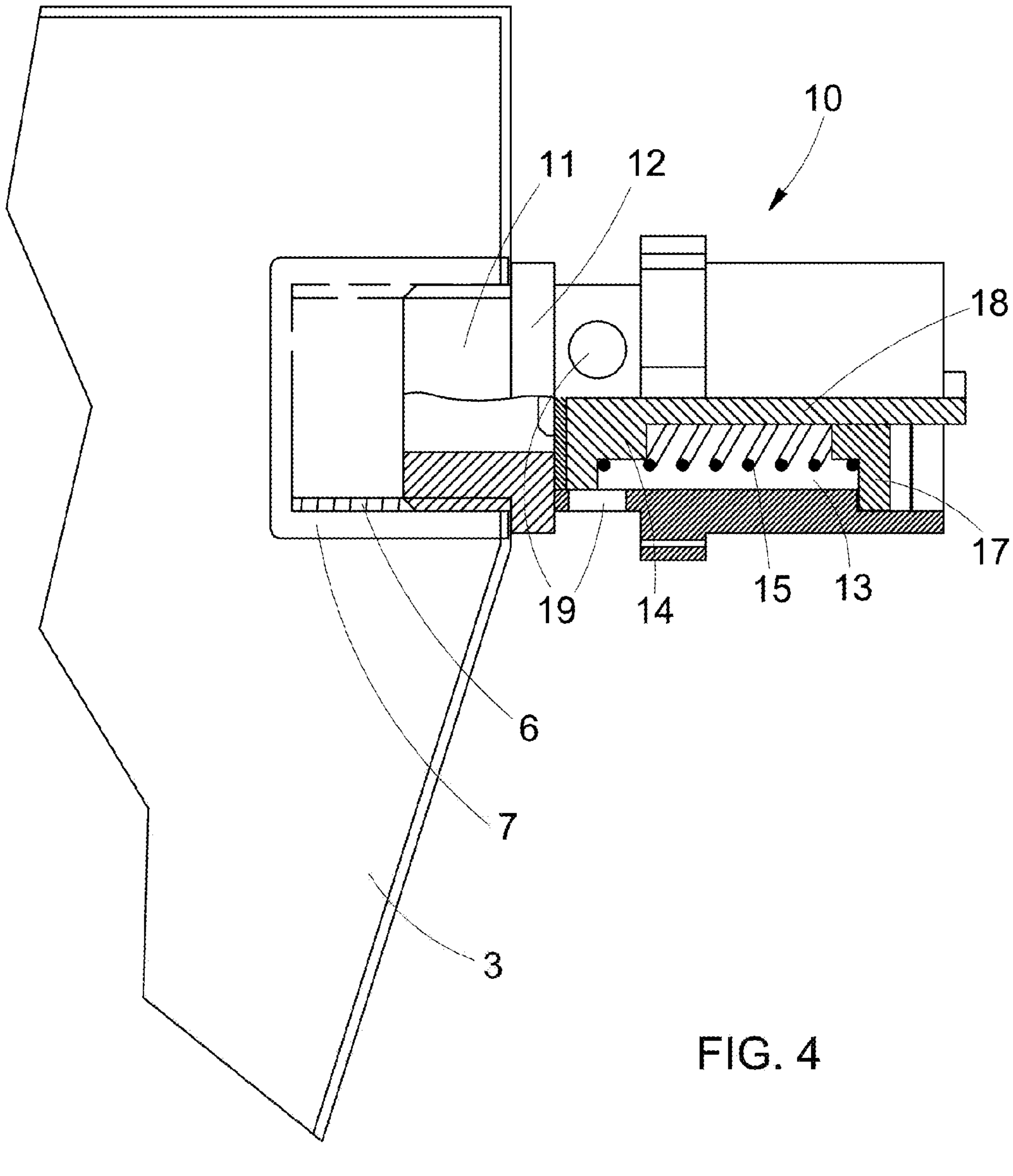
FIGS. 4 and 5 are partial schematic views showing the safety valve partially sectioned, respectively in the position of rest and of intervention.

Referring to these drawings, reference numeral 1 indicates as a whole an infrared heater appliance, which, in a manner in itself known, comprises an outer shell 2 formed by a cap 3 and by a front closure lid 4. Inside the shell 2 are placed an infrared bulb, not shown in the drawings, and the electrical components of the appliance, which will not be described in that in themselves known and not forming part of the invention.

On the cap 3 of the appliance means 5 are provided, in the form of brackets or plates for the attachment of a heat sink, not shown, as well as a plate 9 for attaching the appliance to the wall.

As previously mentioned, the appliance in question complies with the ATEX standard, namely directive 94/9/EC of the European Union for the regulation of apparatuses intended for use in areas at risk of explosion and is therefore with an airtight chamber, in particular the connection between the cap 3 and lid 4 is airtight. Both the cap 3 and the lid 4, normally in glass or glass-ceramic, are resistant to the high temperatures generated by the infrared bulb.

The heat emitted by the bulb causes the pressure to rise inside the appliance, which is higher the greater the power of the bulb. In particular, it was found that with a power of 2 kW or 4 kW the increase in the internal pressure generates risks of explosion of the glass lid 4.

Therefore, according to the invention, on the cap 3 of the appliance a safety valve 10 is placed, having a cylindrical body with a threaded end section 11 screwing into the internal threading 6 of a sleeve 7 inserted in the cap 3. The end section 11 of the valve body has an abutment 12 which abuts against the wall of the cap 3.

The valve body is internally hollow and has a widened seat 13 housing a shutter 14 pushed by a spring 15 against an internal shoulder 16 in order to hold the valve in the closed condition. The other end of the spring 15 abuts against a ring 17 attached inside the valve body and having a central hole through which the stem 18 of the shutter 14 passes. On the valve body, in the immediate vicinity of the external abutment ring 12, at least one hole 19 is provided that places in communication with the outside the internal chamber of the valve.

The spring 15 is calibrated so as to ensure a certain pressure inside the appliance so as to prevent any external explosive mixtures from being able to come into contact with the internal electrical components.

Figure 5:
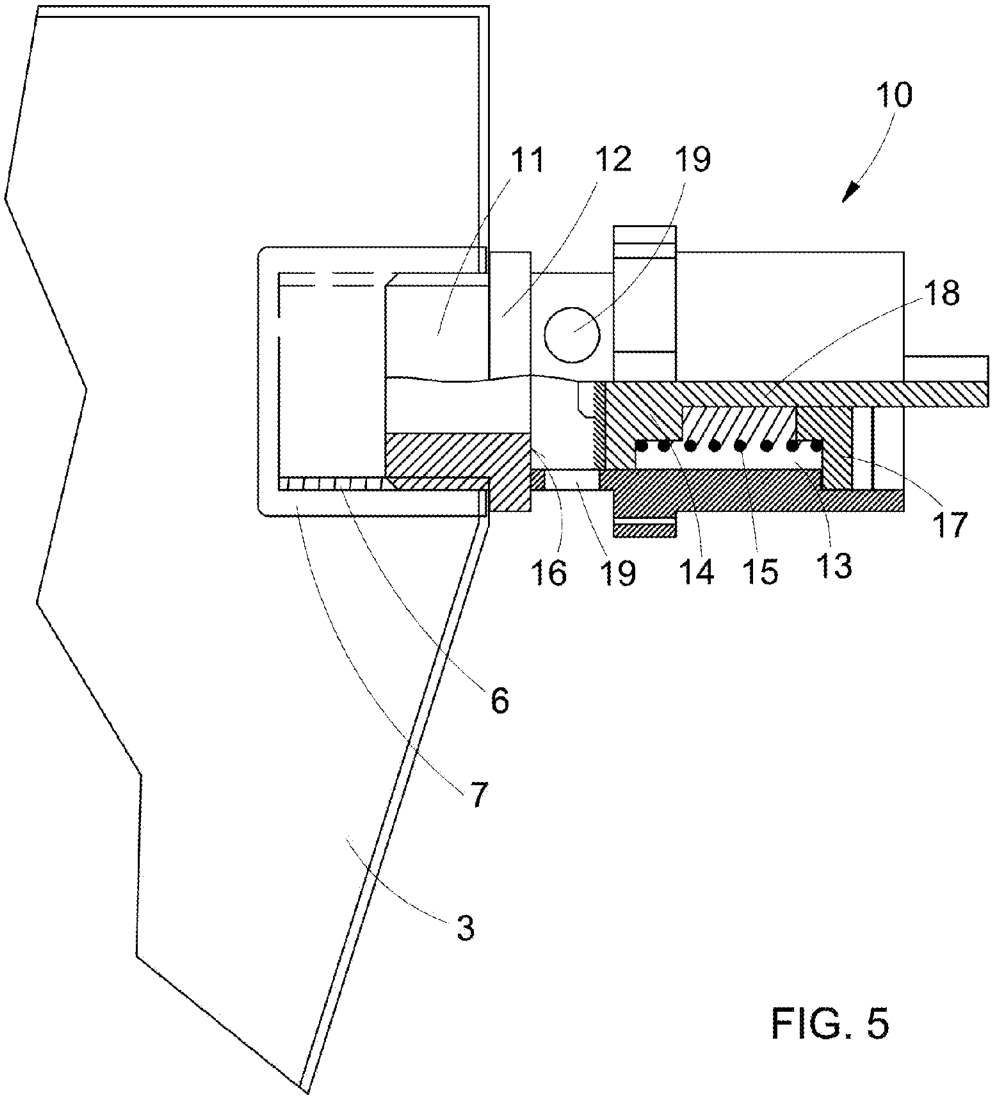

When the internal pressure exceeds the predetermined threshold with respect to that of the external environment, for example 0.10-0.30 atm, the force of the spring 15 is overcome and the shutter 14 is moved away from the shoulder 16, as shown in FIG. 5, discharging externally the internal overpressure through the aforementioned holes 19 in the valve body.

When the internal pressure is re-established the spring 15 returns the shutter 14 into the closed position, as shown in FIG. 4.

Although in the embodiment previously described there was mention of a bulb in the singular, it is evident that the heater appliance according to the invention can also comprise several infrared bulbs.

From what has been disclosed the advantages of the heater appliance according to the invention appear clear, which heater appliance can be used totally safely in areas at risk of explosion, complying with the ATEX standard.

Naturally the invention is not limited to the particular embodiment previously described and illustrated in the accompanying drawings, but numerous detail changes may be made thereto, within the reach of the person skilled in the art, without thereby departing from the scope of the invention itself as defined by the appended claims.

The invention claimed is:

1. An infrared heater appliance comprising:

an airtight chamber comprised of a shell (2) constituted by a cap (3) and a closure lid (4);

an infrared bulb in said shell; and a safety valve (10) mounted on said cap (3), the safety valve being arranged for discharging externally an overpressure in said airtight chamber due to the heat generated by said infrared bulb, wherein the safety valve has only one shutter (14), which is pressed by a spring (15) to urge the safety valve closed, and wherein the spring is calibrated to maintain a predetermined pressure inside the airtight chamber to prevent an external environment from entering the airtight chamber.

2. The infrared heater appliance according to claim 1, wherein said safety valve (10) comprises an internally hollow cylindrical valve body, with a seat (13) wherein said spring (15) is housed.

3. The infrared heater appliance according to claim 2, wherein said valve body has at least one hole (19) which places said seat in communication with the external environment in order to release the overpressure inside the airtight chamber following the displacement of said shutter (14).

4. The infrared heater appliance according to claim 2, wherein inside said valve body an abutment ring (17) is attached for said spring (15) having a central hole for the passage of the stem (18) of the shutter (14).

5. The infrared heater appliance according to claim 2, wherein said valve body has a threaded end section (11) screwing into the internal threading (6) of a sleeve (7) inserted in the cap (3) of the appliance (1), on the valve body an external abutment (12) also being provided, abutting against the wall of the cap (3).

6. The infrared heater appliance according to claim 1, wherein said safety valve (10) intervenes when the internal pressure of the appliance (1) exceeds by 0.10-0.30 atm the external ambient pressure, in order to discharge the internal overpressure.

7. The infrared heater appliance according to claim 1, wherein said infrared bulb has a power up to 4 kW.

8. The infrared heater appliance according to claim 1, wherein the appliance complies with directive 94/9/EC of the European Union for the regulation of apparatuses intended for use in areas at risk of explosion.

9. The infrared heater appliance according to claim 3, wherein inside said valve body an abutment ring (17) is attached for said spring (15) having a central hole for the passage of the stem (18) of the shutter (14).

10. The infrared heater appliance according to claim 3, wherein said valve body has a threaded end section (11) screwing into the internal threading (6) of a sleeve (7) inserted in the cap (3) of the appliance (1), on the valve body an external abutment (12) also being provided, abutting against the wall of the cap (3).

11. The infrared heater appliance according to claim 4, wherein said valve body has a threaded end section (11) screwing into the internal threading (6) of a sleeve (7) inserted in the cap (3) of the appliance (1), on the valve body an external abutment (12) also being provided, abutting against the wall of the cap (3).

* * * * *